US008668569B2

(12) United States Patent

Gilbertson et al.

(10) Patent No.: US 8,668,569 B2

(45) Date of Patent: Mar. 11, 2014

(54) NUMBER SELECTION GAME WITH REDRAW AND FEATURE AWARD ROUNDS

(75) Inventors: Ross Gilbertson, Ultimo (AU); David Kaylock, Pearce (AU)

(73) Assignee: SHFL Entertainment (Australasia) Pty Limited, Milperra NSW (AU)

( * ) Notice: Subject to any disclaimer, the term of this patent is extended or adjusted under 35 U.S.C. 154(b) by 376 days.

(21) Appl. No.: 12/932,482

(22) Filed: Feb. 25, 2011

(65) Prior Publication Data

US 2012/0220356 A1 Aug. 30, 2012

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................. 463/18; 463/16; 463/17; 463/19; 463/20; 463/21; 463/22; 463/23; 463/24; 463/25

(58) Field of Classification Search

USPC ...................................................... 463/16–25

See application file for complete search history.

(56) References Cited

U.S. PATENT DOCUMENTS

| | | | | |
|---|---|---|---|---|
| 5,401,024 | A | 3/1995 | Simunek | |
| 5,935,001 | A | 8/1999 | Baba | |
| 6,270,407 | B1 | 8/2001 | Dodge | |
| 6,315,290 | B1 | 11/2001 | Roethel et al. | |
| 2003/0232638 | A1 | 12/2003 | Luciano | |
| 2006/0094494 | A1 * | 5/2006 | O'Halloran et al. | 463/18 |
| 2007/0207847 | A1 | 9/2007 | Thomas | |
| 2009/0197664 | A1 * | 8/2009 | Schultz | 463/18 |

FOREIGN PATENT DOCUMENTS

| | | |
|---|---|---|
| WO | WO 02/102481 | 12/2002 |

* cited by examiner

*Primary Examiner* — Adetokunbo O Torimiro

(74) *Attorney, Agent, or Firm* — TraskBritt

(57) ABSTRACT

A redraw round and feature round are provided to supplement a game of chance. The game of chance may be implemented on a gaming machine or in a traditional manner as described. The game of chance is based on matching player selected spot numbers or player card numbers to randomly generated numbers. The redraw round is triggered if a predetermined number of redraw trigger numbers are generated and displayed as drawn numbers. In the redraw round the gaming machine generates redraw numbers which supplement the draw numbers. A comparison between the combined set of draw and redraw numbers to the player spot numbers occurs and if a predetermined number of matches occur the player is provided an award. A feature round occurs if a predetermined number of feature trigger numbers are drawn. The feature round provides one or more random award to the player.

17 Claims, 9 Drawing Sheets

NUMBER SELECTION GAME WITH REDRAW AND FEATURE AWARD ROUNDS

FIELD OF THE INVENTION

The invention related to video gaming and in particular to supplemental gaming and award features for numbers based selection games such as keno or bingo.

BACKGROUND

Games of chance upon which wagering may occur are a popular form of entertainment throughout the world. Games of chance are offered and players may wager upon the outcome of the game of chance in the hopes of winning an award. Numerous different types of games of chance are offered to appeal to different people and their changing interests.

Two popular games of chance are keno and bingo. These games are widely offered for play and are common within gaming establishments. Although these games are similar, each game has its own rules and style of play. While bingo and keno are traditional, well known, games of chance, these games may lack excitement offered by a new game of chance. Further, these games do not offer multiple win opportunities and chances for an award. Therefore, to provide additional player excitement and opportunities for an award, the following game modifications and additions overcome the drawbacks associated with the prior art and provide additional benefits.

SUMMARY

A redraw round and feature round are provided to supplement a game of chance. The game of chance may be implemented on a gaming machine or in a traditional manner as described. The game of chance is based on matching player selected spot numbers or player card numbers to randomly generated numbers. The redraw round is triggered if a predetermined number of redraw trigger numbers are generated and displayed as drawn numbers. In the redraw round the gaming machine generates redraw numbers, which supplement the draw numbers. A comparison between the combined set of draw and redraw numbers to the player spot numbers occurs and if a predetermined number of matches occur the player is provided an award. A feature round occurs if a predetermined number of feature trigger numbers are drawn. The feature round provides one or more random award to the player.

One embodiment of the game comprises providing a gaming machine having a screen, memory storing machine-readable code, and a processor configured to execute the machine-readable code. The machine-readable code is configured to accept a wager from a player and present a wagering game to the player on the screen. Then the code generates and displays redraw trigger numbers on the screen and accepts spot number selections from the player. The code then generates and displays draw numbers on the screen and compares the draw numbers to the redraw trigger numbers. Responsive to the comparing of draw numbers to the redraw trigger numbers, the code generates and displays redraw numbers on the screen such that the redraw numbers supplement the draw numbers displayed on the screen to create a combined set of numbers. Then, a comparison occurs between the combined set of numbers to the spot numbers and responsive to comparing the combined set of numbers to the spot numbers, the code or gaming machine provides a wager award to the player if a predetermined number of spot numbers match numbers in the combined set of numbers.

In one embodiment the three redraw trigger numbers are generated and displayed on the screen and the player selects spot numbers from a group of eighty numbers. The step of accepting spot numbers comprises the player touching spot number selections on a touch screen. This method may further comprise generating and displaying feature trigger numbers on the screen and then comparing the feature trigger numbers to the draw numbers. Responsive to the comparison, generating one or more random award amounts and then awarding the player the one or more random award amounts. Responsive to the comparing, if the redraw trigger numbers to not match a predetermined number of draw numbers, then comparing the spot numbers to draw number and if a predetermined number of spot numbers match draw numbers then providing a wager award to the player.

Also disclosed herein is a gaming machine configured to offer a game of chance. The gaming machine comprises a screen configured to present the game of chance to a player and a processor configured to execute machine-readable code. A memory storing machine-readable code is in communication with the processor. The machine-readable code is configured to present the game of chance such that the game of chance comprises accepting a wager from the player, generating one or more redraw trigger numbers, and displaying the one or more redraw trigger numbers on the screen. The machine-readable code is further configured to receive one or more spot numbers designated by the player and generate one or more draw numbers. Then, the code displays the one or more draw numbers on the screen and compares the one or more draw numbers to the redraw trigger numbers and if a predetermined number of redraw trigger numbers match the draw numbers then entering a redraw round.

In this embodiment the redraw round comprises generating one or more redraw numbers and displaying the one or more redraw numbers on the screen. The redraw round then compares the one or more redraw numbers to the spot numbers and if a predetermined number of redraw numbers and draw numbers match the spot numbers, then the player is provided an award.

In one embodiment the screen comprises a touch screen configured to accept input from the player. The award may comprise an award of credits, which are added to a credit display. In one variation, the player selects between 3 and 10 spots and the machine-readable code generates 20 drawn numbers. Three redraw trigger numbers may be generated. In one example embodiment the game of chance further comprises generating one or more feature trigger numbers and displaying the one or more feature trigger numbers on the screen. Then comparing the one or more feature trigger numbers to the one or more draw numbers and if a predetermined number of feature trigger numbers and draw numbers match then awarding the player one or more credits. The gaming machine is also configured to compare the one or more draw numbers to the one or more spots and if a predetermined number of draw numbers and spot numbers match then providing an award to the player.

A gaming machine is disclosed that is configured to offer a game of chance where the game of chance and the machine comprise a screen configured to present the game of chance to a player and a processor configured to execute machine-readable code. A memory is also part of the gaming machine and the memory stores machine-readable code. The machine-readable code is configured to accept a wager from the player, generate and display one or more redraw trigger numbers, generate and display one or more feature trigger numbers and then receive one or more spot numbers designated by the player. The code is further configured to generate one or more draw numbers, display the one or more draw numbers on the screen and compare the one or more draw numbers to the redraw trigger numbers. If a predetermined number of redraw trigger numbers match the draw numbers then the gaming machine enters a redraw round.

The redraw round comprises generating one or more redraw numbers, displaying the one or more redraw numbers on the screen, and comparing a combined group of one or more redraw numbers and the one or more draw numbers to the spot numbers. If a predetermined number of the combined group match the spot numbers then the code or gaming machine is configured to provide an award to the player. The gaming machine may then compare the one or more draw numbers to the feature trigger numbers and if a predetermined number of feature trigger numbers match the draw numbers then entering a bonus round such that the player is awarded one or more credits.

In one embodiment the redraw trigger numbers comprise three numbers and the feature trigger numbers comprise four numbers. In one embodiment the predetermined number of redraw trigger numbers comprises three numbers and the predetermined number of feature trigger numbers comprises four numbers. In this embodiment the game of chance comprises keno with additional redraw and feature award opportunities.

Also disclosed herein is a gaming machine configured to offer a game of chance. In this configuration the gaming machine comprises a screen configured to present the game of chance to a player, a processor configured to execute machine-readable code, and memory storing machine-readable code. The machine-readable code is configured to present the game of chance such that the game of chance comprises accepting a wager from the player, generating one or more feature trigger numbers, and displaying the one or more feature trigger numbers on the screen. The code is also configured to receive one or more spot numbers designated by the player and generate one or more draw numbers, and display the one or more draw numbers on the screen. A comparison occurs between the one or more draw numbers and the feature trigger numbers and if a predetermined number of feature trigger numbers match the draw numbers then entering a feature award round The feature award round comprises generating one or more feature round awards, displaying the one or more feature round awards on the screen, and awarding the player one or more of the displayed feature round awards. The gaming machine or machine-readable code may be further configured to compare the one or more spot numbers to the one or more draw numbers and responsive to the comparison, generate and display one or more redraw numbers. The machine-readable code performs a comparison of a combined set of draw numbers and redraw numbers to the spot numbers and if a predetermined number of the combined set match the spot numbers then providing the player an award.

The number of spot numbers selected by the player may range from three to ten. The number of feature trigger numbers may comprise four and all feature trigger numbers must match draw numbers before a feature award round is triggered. In one configuration the one or more feature round awards comprises five awards and the feature award amounts are randomly generated by the gaming machine Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
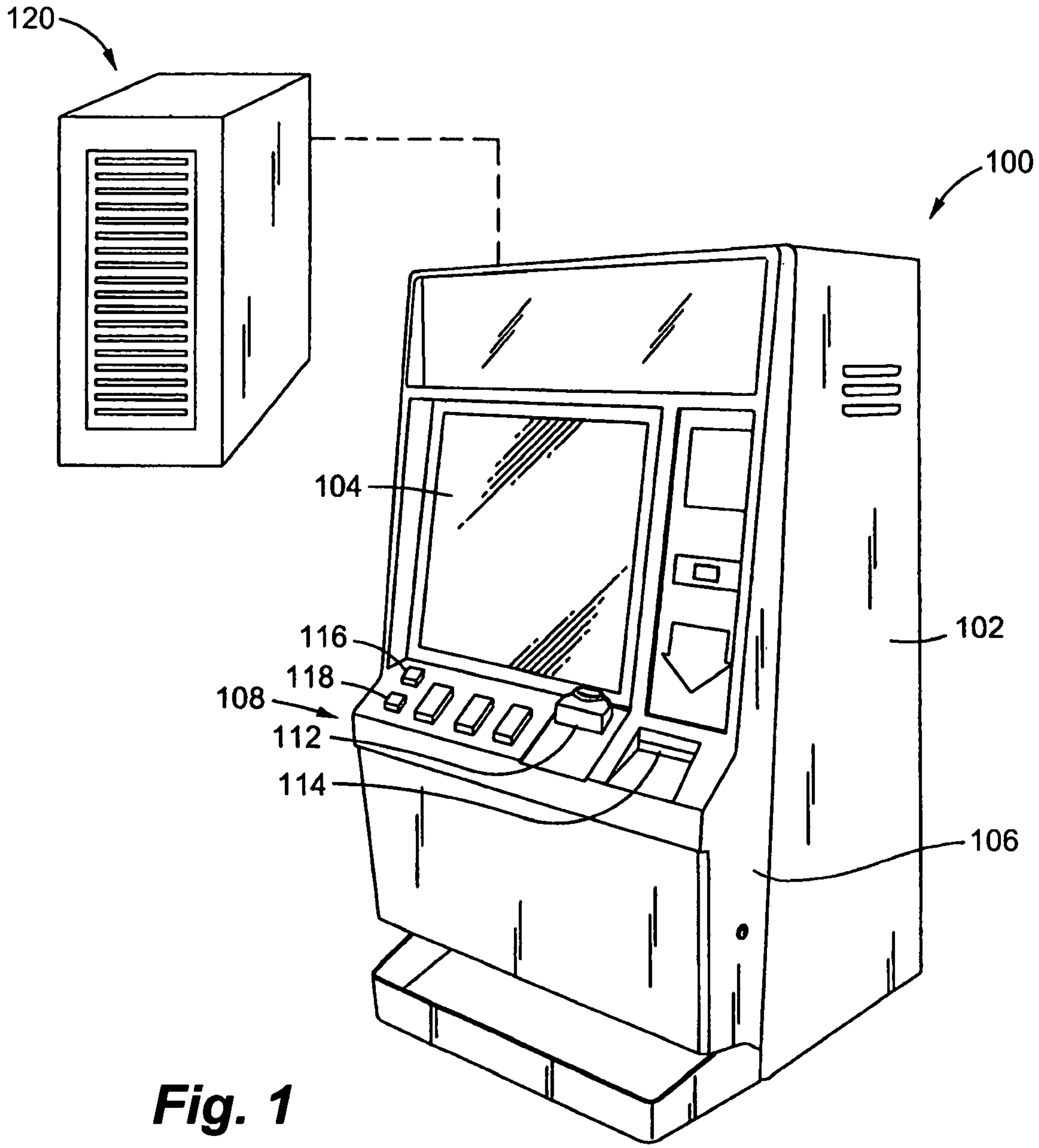
FIG. 1 illustrates an exemplary gaming machine configured to offer the game of chance disclosed herein.

FIG. 1 illustrates one embodiment of a gaming machine 100 at which the game of chance with supplemental features may be implemented or used. In one embodiment, the gaming machine 100 is a wager-based gaming machine configured to present one or more games of chance to a player, which games offer the possibility of an award of winnings. Of course, the gaming machine 100 could be configured to present games or amusing activities based upon payment and either not award winnings or offer the opportunity for points, tickets, prizes or the like.

In one embodiment, the gaming machine 100 defines a generally enclosed interior space for housing one or more components. As illustrated, the gaming machine 100 generally comprises a housing or cabinet 102 for supporting and/or enclosing various components required for operation of the gaming machine. In the embodiment illustrated, the housing 102 may include a door 106 located at a front thereof, the door capable of being moved between an open position which allows access to the interior and a closed position in which access to the interior is generally prevented. The configuration of the gaming machine 100 may vary. In the embodiment illustrated, the gaming machine 100 has an "upright" configuration. However, the gaming machine 100 could have other configurations, shapes or dimensions (such as being of a "slant"-type, bar top, or other configuration as is well known to those of skill in the art). It is noted that the configuration of the door 106 may vary, such as dependent upon the configuration of the gaming machine 100.

The gaming machine 100 preferably includes at least one display device 104 configured to display game information. The display device 104 may be a mechanical, electro-mechanical or electronic display, such as one or more rotating reels, a video display or the like. When the display device 104 is an electronic video display (screen), it may comprise a cathode ray tube (CRT), high resolution flat panel liquid crystal display (LCD), projection LCD, plasma display, field emission display, digital micro-mirror display (DMD), digital light processing display (DLP), LCD touch screen, a light emitting display (LED), organic light emitting diode (OLED) display, or other suitable displays now known or later developed, in a variety of resolutions, sizes and formats (e.g., 4:3, widescreen or the like). The display device 104 may be capable of projecting or displaying a wide variety of information, including images, symbols and other indicia or information associated with game play, game promotion or other events. In one embodiment, the display 104 may be used to present one or more paytables, game symbols, jackpot/payout amounts, bonus game information, etc., associated with the random payout system. It is contemplated that more than one display device 104 may be provided in a gaming machine. Each display device 104 may present different information. For example, a display device 104 may be used to present one or more paytables while another display is used to present a game.

The gaming machine 100 may be configured to present various styles or configurations of games having the inventive features described herein. These may include games in Class III, such as video poker games, keno, slot-type games, and blackjack or other card, dice or various other games now known or later developed, as well as games in Class II, including central determinant games such a video lottery, bingo and bingo-based games, and other games now known or later developed. The games may also be skill based or include one or more skill components. In one embodiment, certain game outcomes may be designated as winning outcomes. Awards may be provided for winning outcomes, such as monetary payments (or representations thereof, such as award of credits), prizes or the like. As is well known in the art, the number of winning outcomes may vary dependent upon the desired payout or winning percentage offered to the players as compared to wagers that are retained by the gaming establishment.

The gaming machine 100 may include one or more player input devices 108 (such as input buttons, a touch-screen display, joystick, touch-pad or the like) that may be utilized by the player to facilitate game play. The gaming machine 100 may include a coin-accepting mechanism 112 for accepting coins and/or a currency or bill acceptor 114 for accepting cash or paper currency. It is also contemplated that other mechanisms now known or later developed may be provided for accepting value for game play, such as credit card, ticket readers or input devices whereby a player may have funds paid from a remote account. The gaming machine 100 may also include a "bet credit" button 118 or the like, such as to permit a player to wager monetary credits credited to the machine.

In one embodiment, the gaming machine 100 may include one or more microprocessors or controllers for controlling the gaming machine, including receiving player input and sending output signals for controlling the various components of the gaming machine 100 (such as generating game information for display by the display 104). The controller may be arranged to display the game of chance, send signals for determining winning combinations, and to cause the display 104 to display winning amount information. In addition, the controller is preferably arranged to determine if a round of game play has resulted in a win, and if so, the amount to be paid to the player for that win.

The gaming machine 100 may include a means for paying a player any winnings accumulated during game play. For example, a "cash out" button 116 may be provided for permitting a player to be paid the winnings or redeeming any credits initially paid into the gaming machine 100. The term "cash out" is used herein to define an event initiated by the player wherein the player receives a number of coins or currency that is equivalent to the value of the player's accrued credit base. Typically when a player cashes out, the player receives either a paper currency voucher or currency in the form of a coin disbursement. If the player decides to receive a coin disbursement, the gaming machine 100 may activate a coin hopper or coin handling device (not shown) which physically counts and delivers the proper number of coins to the player. The coin handling device is commonly configured to transport coins from a supply source (hopper or bin filled with coins) to a coin tray or payout receptacle where the player physically receives the coins. The player might also elect to cash out by having a ticket or other media dispensed, such as via a printer.

The gaming machine 100 may be configured as a stand-alone device or be in communication with one or more external devices at one or more times. For example, the gaming machine 100 may be configured to communicate with a server or as a server based device to thereby obtain game code or game outcome information from a remote server. The gaming machine 100 may also communicate with one or more gaming servers 120 or external controllers. These one or more gaming servers 120 may be configured to perform accounting, player tracking, bonusing, game generation, random outcome and payout generation, or other functions.

In addition to the electronic gaming machine of FIG. 1, it is contemplated that the game of chance and the supplemental features may be offered for play on a personal computer or mobile device (smart phone, tablet or table computing device) having a display, memory, and processor operating is described in FIG. 1. Likewise, the personal computer or mobile device may be linked over a computer or cellular network to interface with other players or a remote server to play the game of chance with supplemental features.

Rules for Base Game of Chance

The base game of chance described herein is a number selection game that has characteristics similar to keno and bingo. Although described below in connection with keno and bingo, it is contemplated that any number- or symbol-based selection game may be implemented with the redraw round and feature award aspects. In one embodiment of the base game a player selects a group of numbers, referred to as spots, from a predetermined group of numbers or symbols shown on a main board. In various different embodiments a player may select a different number of spots and the main board may contain any number of different numbers or symbols. A further set of numbers or symbols are then randomly selected such as by a random number generator, software (machine-readable code) executing on a processor, or by various mechanical systems such as numbered balls in a blower or a barrel.

The objective of the game is for the player to choose numbers or symbols, identified as spots, which will be randomly drawn or selected during the associated selection round. The player typically wagers and then wins a prize depending on the number of spots selected by the player which are also drawn and shown on the main board. The value of the prize is dependent on how much is wagered per game, how many numbers were chosen by the player, and how many numbers matched those selected in the draw.

While these are the traditional game rules, there are other rules which may vary depending upon where it is played. For example, the rules may specify how many spots the player is allowed to choose, and how many of these spots must be matched to the drawn numbers before the player is eligible to receive an award. Likewise, the number of numbers drawn may also vary.

In one embodiment, the player selects between three and ten spots from a total of eighty numbers, with twenty numbers from the total number being drawn at random and displayed on the main board. In various other embodiments the player may select any number of spots from any total number, in which case the numbers drawn will also vary.

In an electronic video machine, the main board may be shown on a video screen associated with the machine. When played at a gaming machine or online using a computer program, each game may be played individually rather than among a large number of people watching a shared keno or bingo board such as is offered in a casino or club, for example.

Figure 2A:
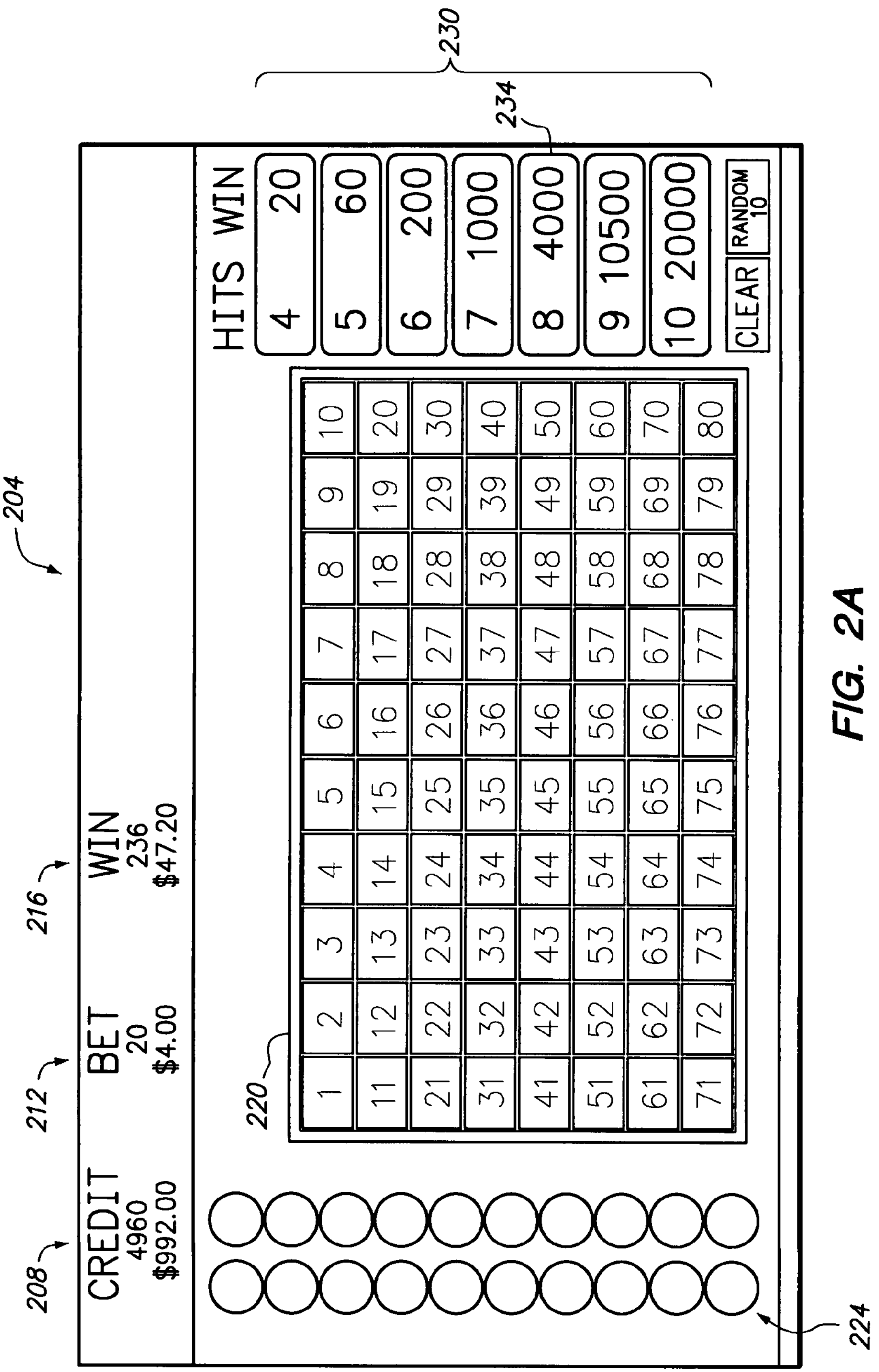
FIG. 2A illustrates an exemplary embodiment of screen display for a game of chance with player spot selections.

FIG. 2A illustrates an exemplary embodiment of screen display 204 for a game of chance with player spot selections. As is understood, this is but one possible screen arrangement and based on the disclosure and the claims that follow one of ordinary skill in the art may arrive at alternative screen arrangements to present the base game.

As part of this screen display 204, a credit summary 208, a bet summary 212, and a win summary 216 are provided. The credit summary 208 shows the number of credits stored on the machine. The credits are available for play or may be cashed-out for money or as a ticket as part of a ticket in, ticket out system. The bet summary 212 show the amount bet by the player on the current game round. A various number of credits may be wagered such that increased wagers result in increased awards upon the occurrence of a winning outcome. The win summary 216 shows the amount of credits won during the current game round. The credit winnings are added to the credit summary 208 or may be cashed out in the form of cash or a ticket.

Also part of this exemplary screen display is a main board 220. In this embodiment, the main board shows the numbers that are available for spot selection by the player and also displays, during the game round, the numbers drawn by the gaming machine. Various different main board display modes may be available to show the spots selected by the player, the numbers drawn by the gaming machine, and the hits, which are the selected spots that correspond to numbers drawn by the gaming machine. These different display modes may comprise circles, squares, or other geometric shapes, colors, highlighting, or flashing indicators.

The spots selected by the player may be shown on the main board 220 or also shown on another portion of the screen. In this example embodiment twenty numbers are drawn by the gaming machine but in other embodiment another amount of numbers could be drawn and displayed. Drawn numbers are displayed on the main board 220 and a drawn number board 224. In other embodiments other game information may be shown on the drawn number board 224 such as but not limited to the selected spots which correspond to drawn numbers.

A results board 230 is also provided to provide information to the player regarding the paytable for the selected game parameters and corresponding game results. In this example screen display 204 the player selected ten spots. Consequently, the results board 230 displays the paytable rates for the number of spots which are selected by the player. For example in a system allowing the selection of three to ten spots, the system would initially display the pay rate for a three spot match in paytable. Then as the player selects additional spots, the paytable is automatically updated to display the pay rate for the additional spots. As shown in this example embodiment, if the drawn numbers match four spots, the player wins twenty credits, five spot matches wins sixty credits, six spot matches wins two hundred credits, seven spot matches wins one thousand credits, eight spot matches wins four thousand credits, nine spot matches wins 10,500 credits and ten spot matches wins 20,000 credits. For example, if the player were to correctly select eight spots 234, the player would be awarded four thousand credits. Different awards are earned by the player based on the amount bet by the player and the number of spots selected in relation to the number of spots hit. In this embodiment, for a fixed number of spots selected, a greater number of hits results in a greater award paid out to the player. For example, if the player selects eight spots, then six hits pays a larger award than five hits. Likewise for fixed number of hits, the fewer spots the player selects results in a greater pay out rate. For example, if the player were to end up with four hits, then they would receive a higher pay out rate if they selected six spots than if they had selected nine spots. Payout rates will vary across different embodiments.

During game play the player places a wager and selects how many spots they will play by selecting numbers from the main board. When all the desired spots are selected the player activates the draw feature of the game. In this embodiment the number of spots selected by the player is determined by how many numbers they touch on the main board. In this embodiment the player selects spots by touching the main board 220, which is a touch screen display, to select the spot selections. The selected spots are shown as square on the main board 220 and may also be shown with other visual effects such as a different color or highlighting. Alternatively, the player can select spots by pressing a “randomize” button (not shown) on the gaming machine and/or a touch screen display, in which case the gaming machine replaces the numbers previously selected by the player as spots with randomly generated numbers.

As a further alternative, the player can automatically select ten spots by pressing a “random 10” button on the gaming machine and/or touch screen display. In the event the player makes an automatic selection by pressing the “random 10” button, the gaming machine randomly selects ten spots for the player.

In yet another alternative, the player can add or subtract spots by pressing a “+ spot” button (not shown) or “− spot” button (not shown) on the gaming machine and/or a touch screen display. The player can also deselect spots by pressing a selected spot on the touch screen, or deselect all of the selected spots by pressing a “clear” button on the gaming machine and/or touch screen display.

Figure 2B:
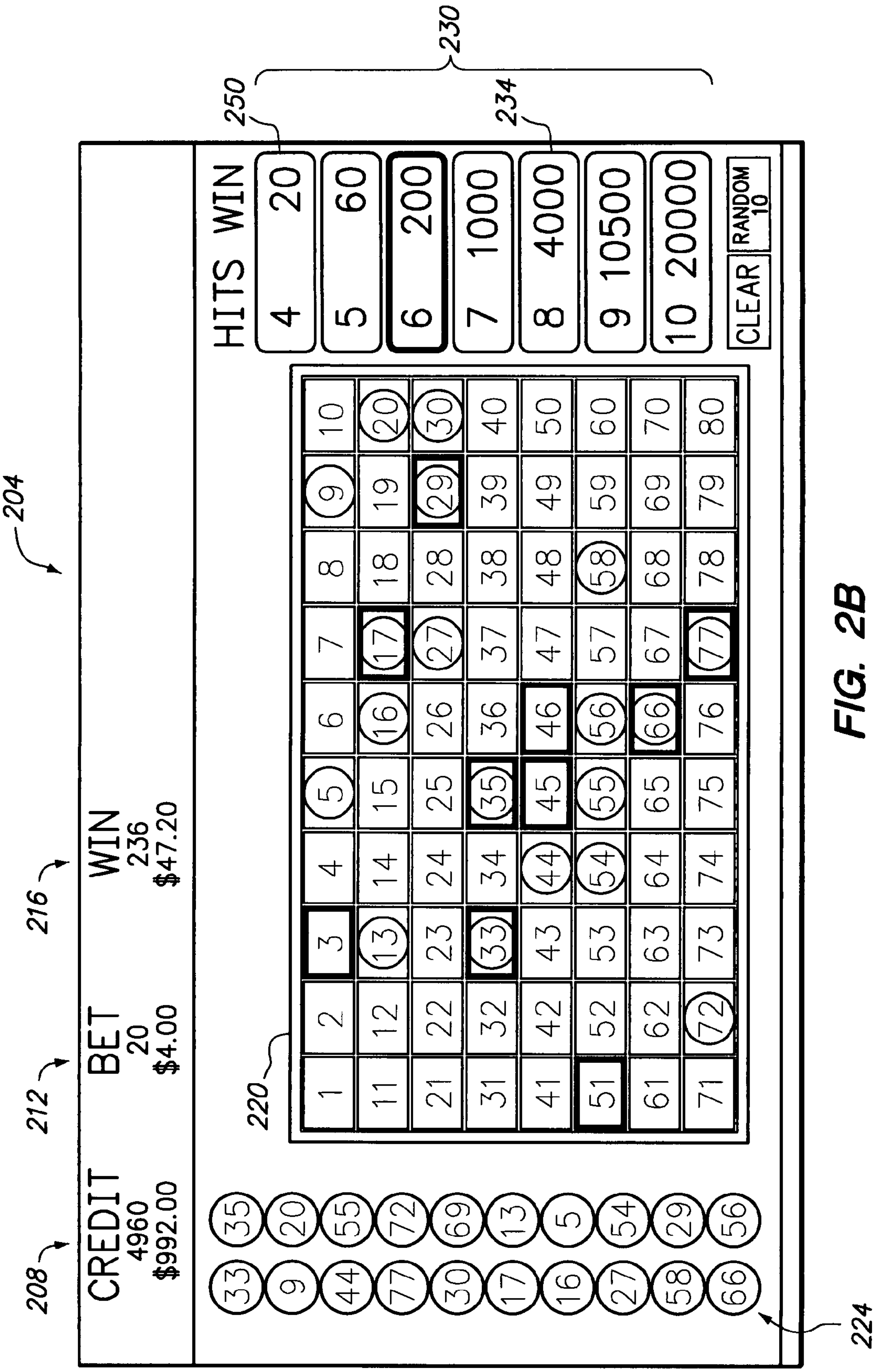
FIG. 2B illustrates an exemplary embodiment of a screen display for the game of chance showing player spot selections and drawn numbers on a main board.

When the player finishes selecting spots, the player activates the draw feature of the game and the gaming machine generates random numbers to represent the drawn numbers. FIG. 2B illustrates an exemplary embodiment of a screen display for the game of chance showing player spot selections and drawn numbers on a main board. As shown in FIG. 2B, the drawn numbers are shown with a circle around the number and the drawn numbers are also shown on in the drawn number board 224.

After the number draw is complete the results board 230 displays the number of matching spots to drawn number and the corresponding credits won. A comparison occurs between the player spots and drawn numbers to determine how many spots match the drawn numbers. A winning game outcome determination is made at this step. In this embodiment the results board highlights that six hits occur because six spots match 250 the drawn numbers. Namely spots 17, 29, 33, 35, 66, and 77 match the drawn number and these are designated with both bolded square and circle around the number on the main board 204. In this example game outcome, since six of the ten spots the player selected were drawn, the player is awarded two thousand credits, as identified by the highlighted six spot match line in the results board 230.

Redraw Round

Figure 3:
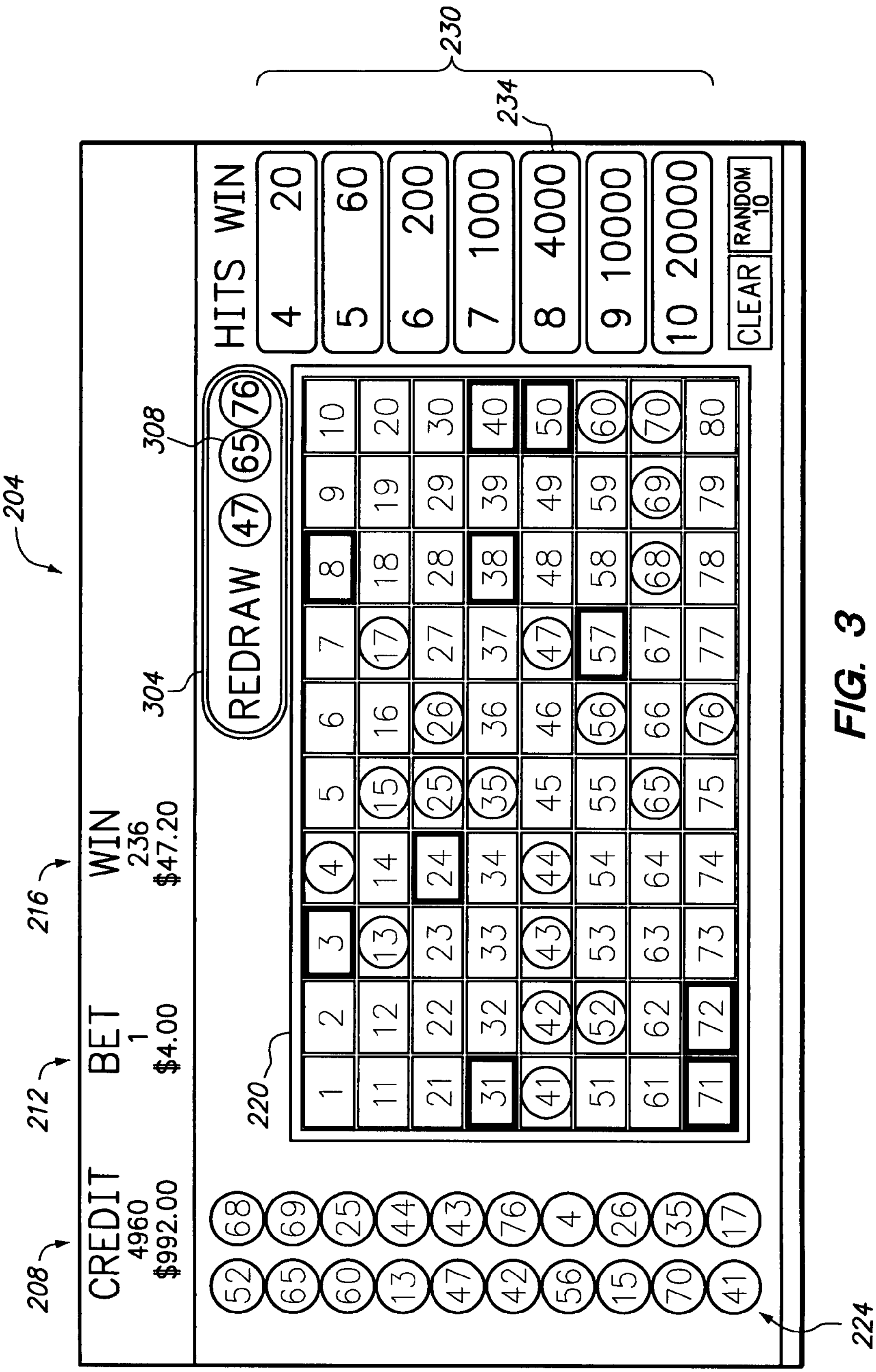
FIG. 3 illustrates an exemplary embodiment of a screen display for the game of chance showing redraw trigger values and number draws, which trigger a redraw round on the main board.

To increase game win opportunities and increase game excitement and interest, a redraw round is added to the base game described in connection with FIGS. 2A and 2B. FIG. 3 illustrates an exemplary embodiment of a screen display for the game of chance showing redraw values and number draws which trigger a redraw round on the main board. As shown in FIG. 3, a redraw number display 304 shows a set of three redraw trigger numbers 308. In this embodiment and random number generator cycle the redraw trigger numbers are 47, 65, and 76. In this embodiment the gaming machine randomly or otherwise selects the redraw trigger numbers 308. In another alternative, the player is allowed to choose the set of numbers that causes the redraw feature to trigger. The redraw trigger numbers 308, if drawn during the base game as draw numbers trigger or start the redraw round. In some embodiments the redraw round may require a side bet or side wager to participate in the redraw while in other embodiments, play of the base game automatically qualifies the player for participation in the redraw round.

Although this example embodiment utilizes three redraw trigger numbers 308, other embodiments may have a different number of redraw trigger numbers. For example, only one or two redraw trigger number 308 may be selected or more than three redraw trigger numbers may be selected and displayed.

The player then selects spot selections. In this embodiment the player selects ten spots. The spots selected are 3, 8, 24, 31, 38, 40, 50, 57, 71, and 72.

The executable machine-readable software code or based input from a gaming server then randomly selects the draw numbers. As shown in FIG. 3, the drawn numbers are 52, 68, 65, 69, 60, 25, 13, 44, 47, 43, 42, 76, 56, 4, 15, 26, 70 35, 41, 17. These drawn numbers are designated as drawn numbers by being placed within a circle and on the drawn number board 224. As can be seen, the player outcome on the base game is a non-winning outcome because none of the spot numbers match the draw numbers.

However, as shown on the main board 220, the drawn numbers shown inside a circle include the redraw trigger numbers 47, 65, and 76 and as such the redraw is triggered. In different embodiments different percentages of the redraw trigger numbers must be drawn during the base game to trigger the redraw. For example, in this embodiment all of the redraw trigger must be drawn to enter the redraw round. It is also contemplated that in other embodiments the number of redraw trigger numbers that match the drawn numbers would determine the number of new number draws the player gets in the redraw round. For example, if the redraw set consists of five trigger numbers, then matching three of the five redraw trigger numbers to the drawn numbers would give the player only five additional redraw numbers generated and displayed in the redraw round, while drawing four of the five redraw trigger numbers would give the player ten redraw numbers in the redraw round. Drawing all of the five redraw trigger numbers causes the gaming machine to generate and display for the player twenty (i.e., the maximum) numbers in the redraw.

A further alternative is to allow the player to arrange a redraw set of nine trigger numbers into a 3×3 matrix, such that the redraw is triggered if three drawn trigger numbers form a horizontal, vertical, or diagonal line across the matrix. This concept can be expanded to any shape, pattern or configuration of redraw trigger numbers.

In other embodiments other percentages of the redraw trigger numbers must be drawn for the redraw round to occur. For example, one embodiment may require that only two of three (66%) redraw trigger numbers be drawn or only three of four (75%) trigger numbers be drawn to trigger the redraw.

Figure 4:
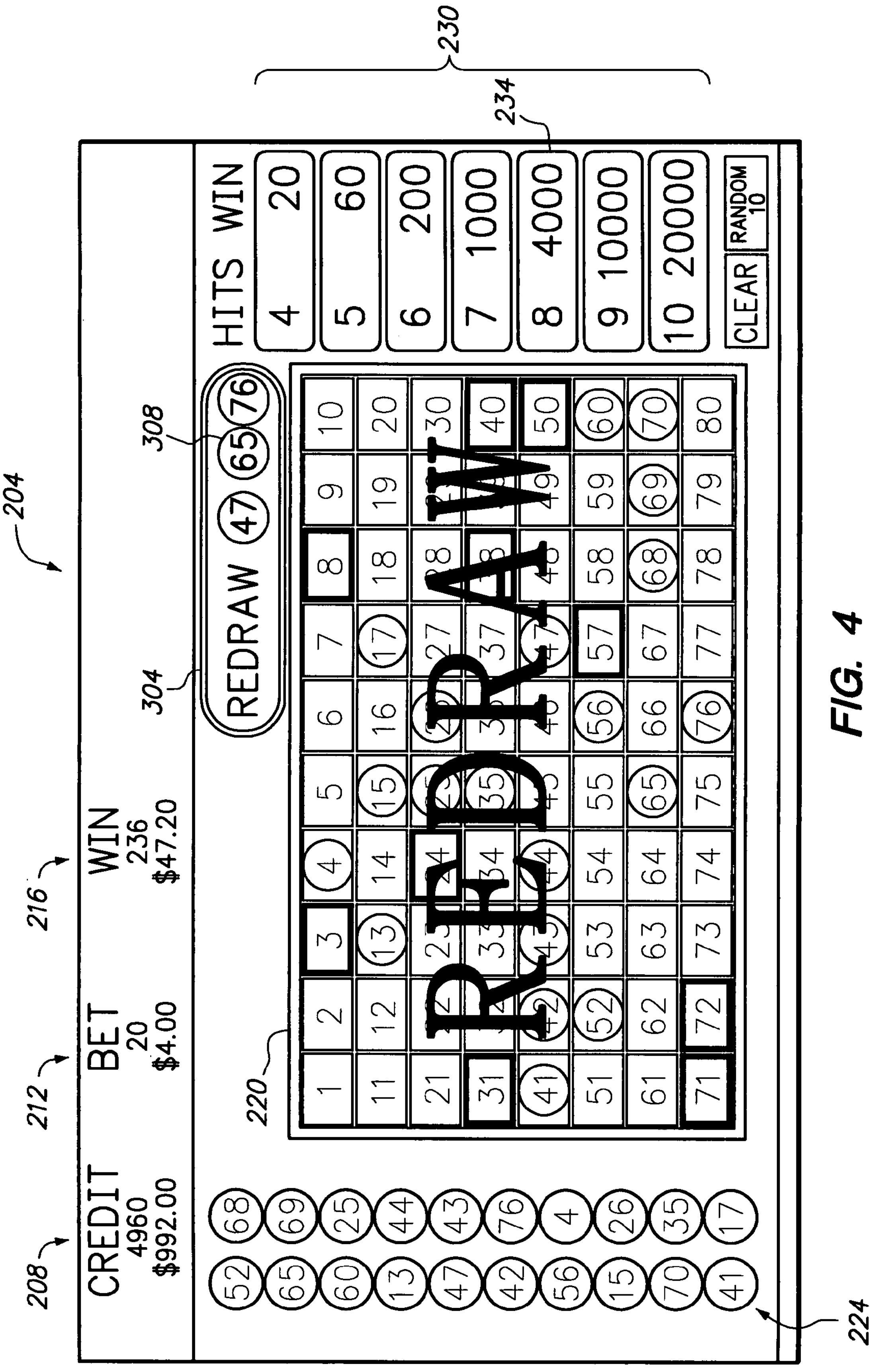
FIG. 4 illustrates an exemplary embodiment of a screen display for the game of chance showing a redraw notice to the player superimposed on the main board.

The redraw round activates the gaming machine to display a redraw announcement as shown in FIG. 4, and draw an additional set of drawn numbers, referred to herein a redraw numbers.

Figure 5:
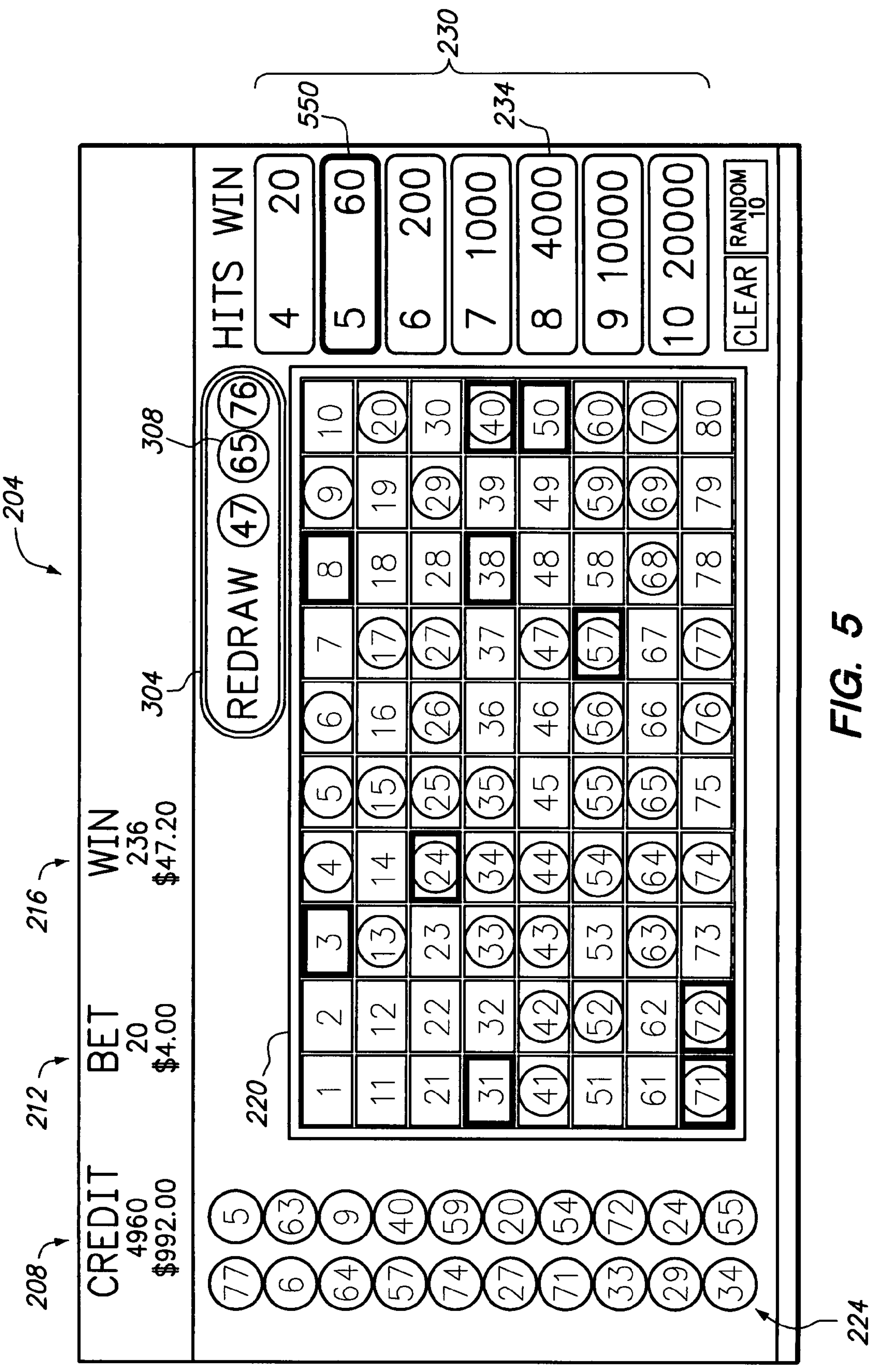
FIG. 5 illustrates an exemplary embodiment of a screen display for the game of chance after a redraw.

The redraw numbers are shown in the main board 220 in addition to the original set of drawn numbers. FIG. 5 illustrates an exemplary embodiment of a screen display for the game of chance after a redraw. As shown in FIG. 5 an additional numbers, referred to as redraw numbers, are randomly drawn by the machine-readable code executing on the gaming machine or received from a game server, and displayed on the main board 220. In this embodiment twenty redraw numbers are drawn and the twenty redraw numbers are displayed on the main board 220 by highlighting, bolding, geometric offsets or other means. In this embodiment the redraw numbers are added to the main board 220 and are highlighted in the same way as the original drawn numbers, by being placed inside circles. The redraw numbers are 5, 6, 9, 20, 24, 27, 29, 33, 34, 40, 54, 55, 57, 59, 63, 64, 71, 72, 74, and 77.

After the redraw numbers are designated on the main board 220, the gaming machine performs a comparison to determines how many spots, if any, match the total combined set of draw numbers (original drawn numbers and redraw numbers). In this embodiment after the redraw, five spots match the combined set of draw number and redraw numbers. The matching spots are 24, 40, 57, 71, and 72. Based on the number of spots that match to total drawn number, the game outcome is determined and the player is provided an award if sufficient matches occur. In this embodiment five spots match 550 so the player is awarded sixty credits. Hence, this redraw round results in the player advancing from a losing outcome to an award of sixty credits. As can be appreciated, this increases player interest and extends game play by providing additional winning opportunities and payouts. After the conclusion of the redraw round, a new game may start.

In the event a redraw round is triggered, an award is made after the base game if the player receives a winning outcome in the base game, and again, after the redraw of additional numbers occurs based on the redrawn comparison. As such, two comparison and award rounds may occur. Alternatively, when a redraw is triggered, a single comparison may occur after the redraw of additional numbers. If a single comparison occurs, a single award for winning game outcomes may be made based on the matches between the spot numbers and the combined set of draw numbers and redraw numbers.

It is also contemplated that when a redraw is triggered, the redraw may appear to a player as a new free game wherein the original spots selected by the player remain and the redraw numbers replace the originally drawn numbers. Then, a comparison occurs to determine the numbers spots that match the redraw numbers and a second award is based on this comparison.

The benefits gained by the redraw round include additional win and award opportunities for the player, larger potential payouts, and more drawn numbers, which all increase player interest and extend game play. Because there are additional numbers drawn, the player has additional chances to match the player's selected spots. This provides the player with a greater chance to win as compared to just the base game because when triggered, the redraw round drawn additional numbers there by generating additional win opportunities.

Likewise, these additional win opportunities result in the opportunity for a much larger award. For example, in reference to FIG. 5, if the player hits five spots during the base game draw they are awarded sixty credits. If, however, during the redraw round two additional spots are matched to the drawn numbers the award to the player would jump to one thousand credits. This is an award that is over sixteen times larger than the base game award without the redraw round. This large payout opportunity increases game interest and game play.

In addition, the redraw round also provides the player with an additional opportunity to win even when the base game outcome resulted in a non-winning outcome. Hence, even though the player loses in the base game, the redraw round provides an opportunity to win an award. These added game award opportunities increase player interest and increase game play.

Feature Round

Figure 6:
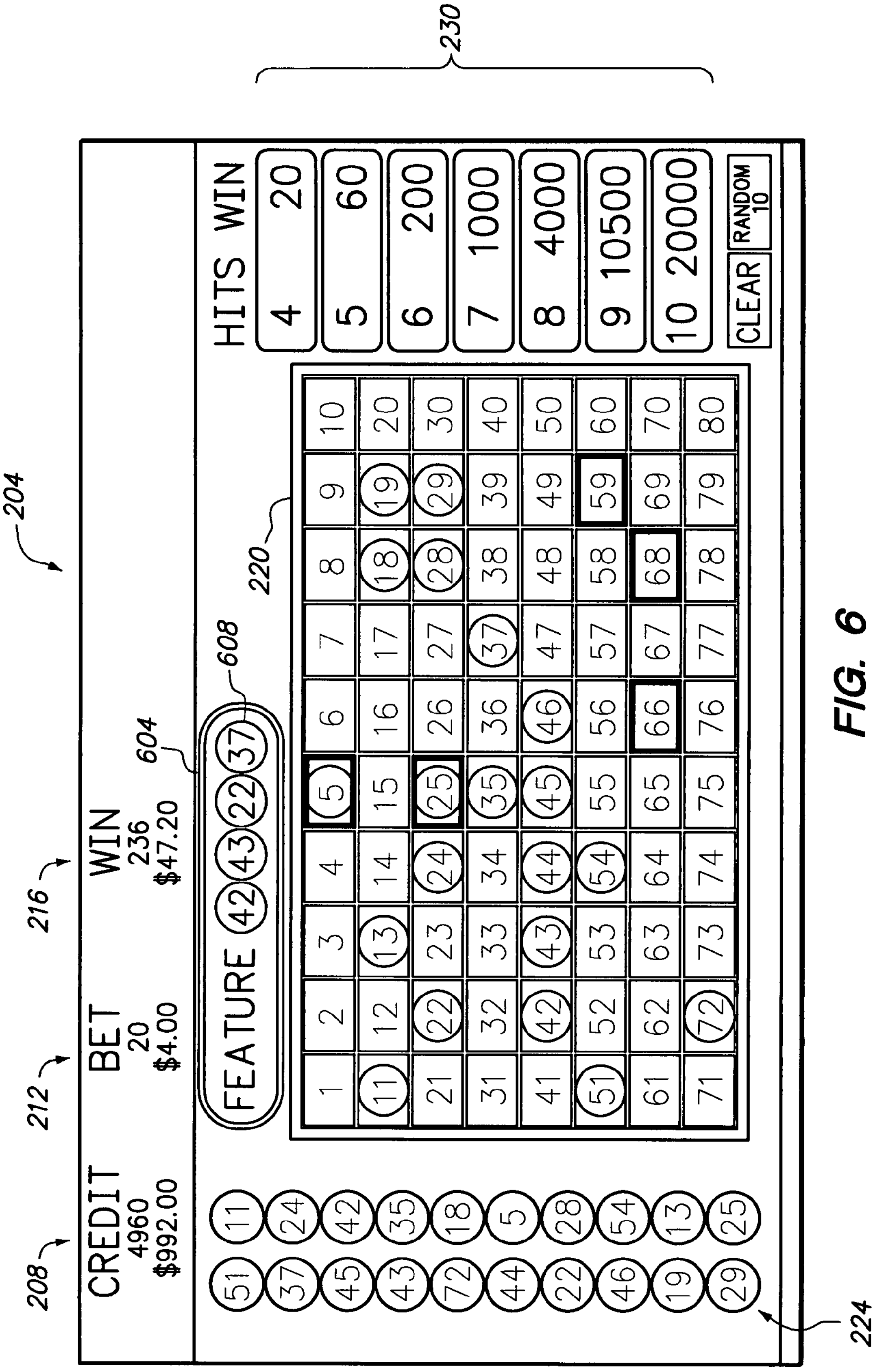
FIG. 6 illustrates an exemplary embodiment of a screen display for a game of chance showing feature trigger values, which trigger a feature award round.

In another embodiment of the base game, a feature round is also incorporated. FIG. 6 illustrates the feature round 604 as shown in the screen display 204. In general, the feature round comprises a selection of one or more feature trigger numbers 608 which, when drawn as draw number in the base game trigger a feature round. The feature trigger numbers may be selected by the player or by the gaming machine. In this example embodiment the feature trigger numbers are drawn by the gaming machine and are displayed before the spot selection and drawn numbers are generated and displayed.

To enter the feature round, the drawn numbers must match a predetermined number of feature trigger numbers. If a predetermined number of feature trigger numbers match the drawn numbers, then the base game enters the feature round. In the feature round, the player is presented with one or more random awards which may range in value from zero credits to the maximum award amount. The house may select how many credits are to be awarded when all or a predetermined number of feature trigger numbers 608 are drawn in the base game.

In this embodiment all of the feature trigger numbers must be drawn to enter the feature round. It is also contemplated that in other embodiments the number of feature trigger numbers that match the drawn numbers would determine the amount or a multiplier for the award that is part of the feature round. For example, if the feature trigger number set consists of five trigger numbers, then matching three of the five feature trigger numbers to the drawn numbers may give the player only one of the five possible award, or a 1/5 award multiplier, while drawing four of the five feature trigger numbers would give the player three of the five awards or a 3/5 award multiplier. Drawing all of the five feature trigger numbers causes the gaming machine to generate and provide all of the awards to the player or a 100% award multiplier.

A further alternative is to allow the player to arrange a feature trigger number set of nine trigger numbers into a 3×3 matrix, such that the feature round is triggered if three feature trigger numbers form a horizontal, vertical, or diagonal line across the matrix. This concept can be expanded to any shape, pattern or configuration of feature trigger numbers.

In other embodiments, other percentages of the number must be drawn for the feature round to occur. For example, one embodiment may require that only two of three (66%) feature trigger numbers be drawn or only three of four (75%) trigger numbers be drawn to trigger the feature round.

In this example embodiment shown in FIG. 6, the feature trigger numbers are 42, 43, 22 and 37. The draw numbers are 5, 11, 13, 18, 19, 22, 24, 25, 28, 29, 35, 37, 42, 43, 44, 45, 46, 51, 54, and 72. Because a predetermined number of feature trigger numbers matched the draw numbers, in this example all the feature trigger numbers must match, then a feature award round is triggered. If the feature trigger numbers do not match the draw numbers then the base game is over and a new game may begin.

Figure 7:
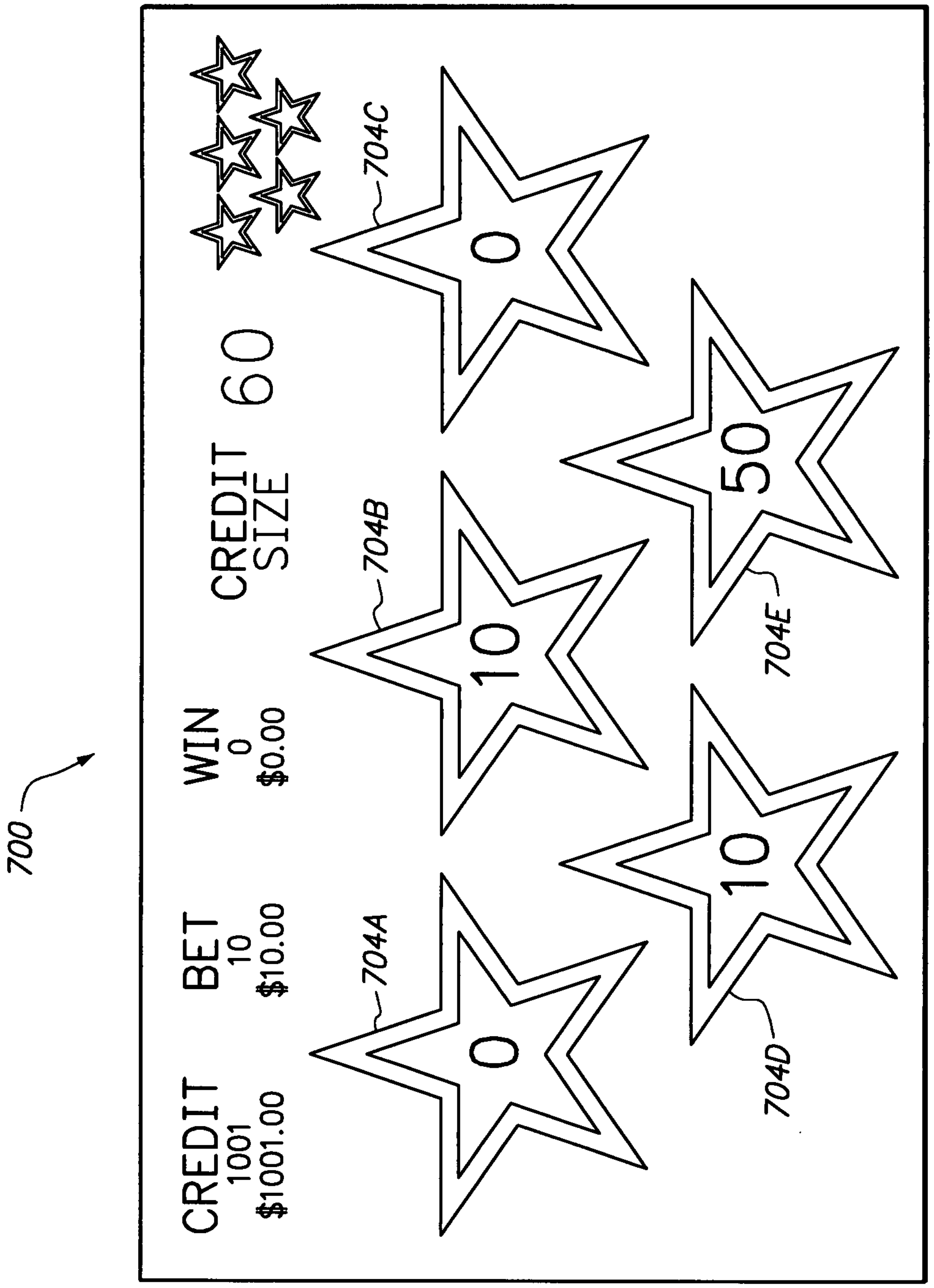
FIG. 7 illustrates an exemplary embodiment of a screen display for the game of chance showing a feature credit awards to the player.

FIG. 7 illustrates an exemplary embodiment of a screen display 700 for the game of chance showing a feature award as won by the player in the feature award round. As shown in FIG. 7, the award screen display 700 presents the random award to the player. In this embodiment the award is a credit award that may be of a predetermined number of credits or a random number of credits. As shown, award displays 704A-704E display the amount of credits awarded to the player as part of the triggering of the feature round.

In other embodiment other prizes or awards may be provided in response to the feature trigger numbers matching the drawn numbers in the base game. These awards may include an award of a physical prize, such as a product, or an award of services. The award may also comprise free play or play only credits.

It is also contemplated that in one embodiment of the game both the redraw round and the feature round are presented. In such an embodiment, the redraw trigger numbers 308 for the redraw round are shown on the screen display along with the feature trigger numbers.

If both the redraw round and the feature award round are enabled in the same base game, then it is contemplated that the feature award round may only be available after the base game and not the redraw feature. It other embodiments however, the feature round may be available after the redraw feature. In addition, it is contemplated that in some embodiments the redraw trigger numbers may be different than the feature trigger numbers, but in other embodiments the respective trigger numbers may overlap.

Figure 8:
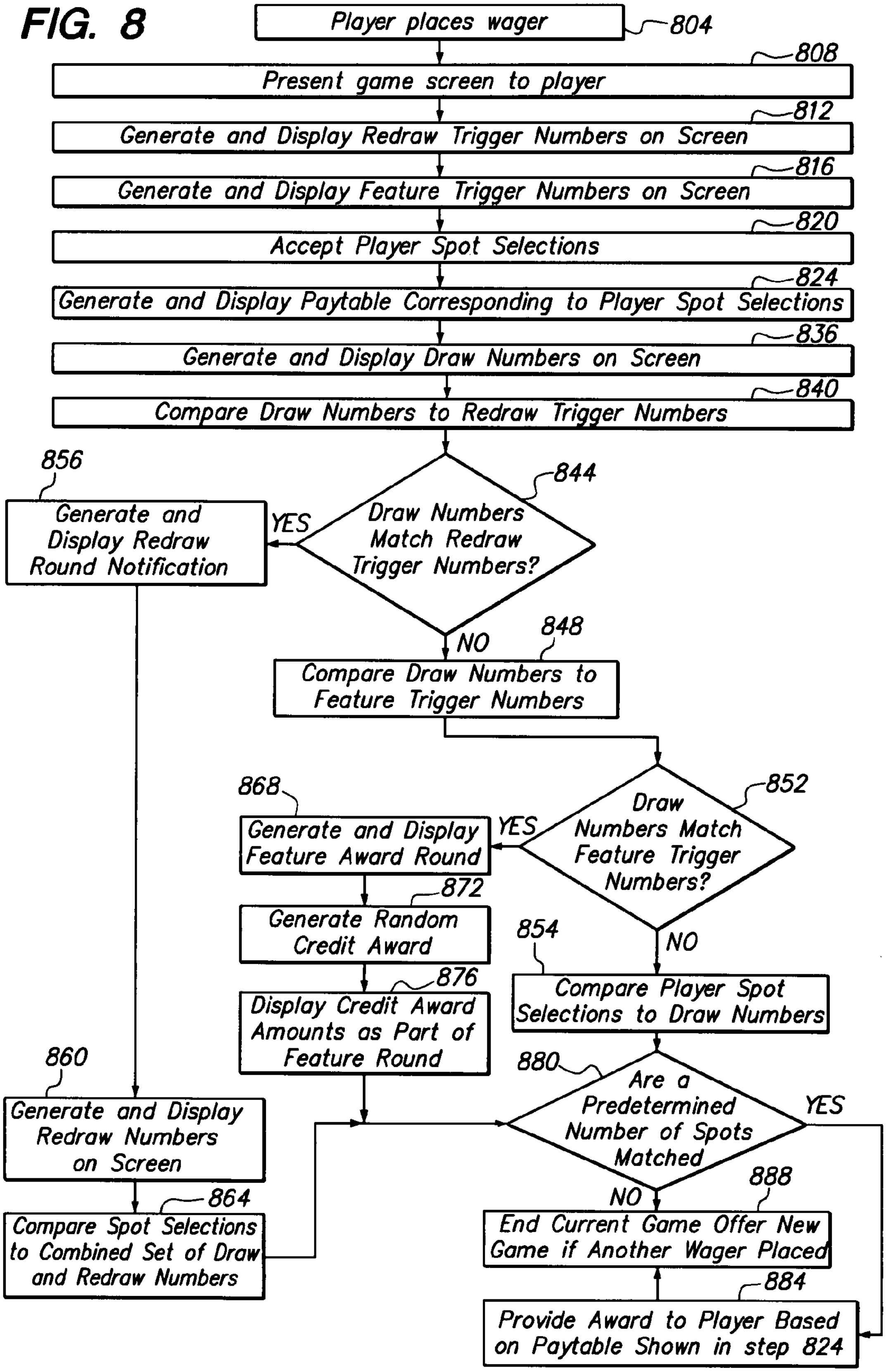
FIG. 8 is a flow diagram of an example method of game play.

FIG. 8 is a flow diagram of an example method of game play. This is but one possible embodiment and as such one of ordinary skill in the art may arrive at different methods of play that do not depart from this disclosure and the claims that follow. It is also contemplated that the steps of this method may occur in different order than that shown. For example, the feature round, if triggered may occur before the redraw round, or after the base game has been settled.

At step 804 the player places wager or otherwise starts the game. This step can be considered as the gaming machine, casino, or game operator as accepting a wager. Then at step 808 the gaming machine presents the game screen as shown above in FIG. 2A to the player to thereby present the wagering game or game of chance to the player.

At step 812, the gaming machine, such as its random number generator, generates and displays the redraw trigger numbers on the screen. The redraw trigger numbers are the numbers that, if drawn by the gaming machine in the base game, trigger a redraw round. Any number of redraw trigger numbers may be generated and displayed. In one embodiment the player selects the redraw trigger numbers. At step 816 the gaming machine generates and displays the feature trigger numbers on the screen. The feature trigger numbers are the numbers that, if drawn by the gaming machine in the base game, trigger a feature round.

At step 820 the gaming machine accepts player spot selections. This input may be provided in any manner, and in one embodiment occurs by the player touching displayed numbers on a touch screen. Then at step 824, the gaming machine generates and displays a paytable corresponding to the player spot selections. At step 836, the gaming machine generates and displays the draw numbers on the screen. The draw numbers are randomly generated numbers selected by the gaming machine.

At step 836 the gaming machine generates and displays the draw numbers on the screen or in some way conveys the draw numbers to the player. Then, at step 840, the gaming machine compares the draw numbers to the redraw trigger numbers to identify matches or overlap.

At decision step 844 and based on the comparison of step 840, a determination is made to determine if the draw numbers match the redraw trigger numbers. If at decision step 844, the redraw trigger numbers match or overlap with the draw numbers, then the game advances to step 856. At step 856, the gaming machine generates and displays or outputs the redraw round notification. Any type notification may occur including video or audio announcements. At step 860 the gaming machine generates and displays the redraw numbers on the screen. Then, at step 864, the gaming machine compares the spot selections to the combined set of draw numbers and redraw numbers. Based on this comparison, the game outcome can be determined as is discussed below at decision step 880.

Alternatively, if at decision step 844 the redraw trigger numbers to not match or overlap the draw numbers then the game advances to step 848. At step 848 the gaming machine compares the draw numbers to the feature trigger numbers to determine if the feature trigger numbers were drawn as the draw numbers.

At decision step 852 the game decides whether the draw numbers match the feature trigger numbers. If the draw numbers match the feature trigger numbers then the game advances to step 868. At step 868, the gaming machine generates and displays a feature award round. For example, in this embodiment, at step 872, the gaming machine generates a random credit award and at step 876 displays the credit award amount(s) on the screen. These credits are provided to the player.

Alternative, if at step 852 the draw numbers do not match the feature trigger numbers, then the feature round is not triggered and the game advances to decision step 880.

At decision step 880, the gaming machine determines if a predetermined number of spots match. This may also be referred to as a number of hits. This comparison may occur between the spots and the combined set of draw numbers and redraw numbers if a redraw was triggered, or if a redraw was not triggered, between the spots and the draw numbers. The predetermined number required for an award and the amount of the award is shown in the paytable. Based on this comparison the game awards are determined. If at decision step 880 the predetermined number is met for an award, then at step 884 the gaming machine provides one or more awards, such as credits, to the player based on the paytable shown in step 824. After step 884, the game advances to step 888, which is discussed below.

Alternatively, if at decision step 880 the match determination reveals that a predetermine number of matches did not occur, such as not enough hits occurs to earn a payout according to the paytable, then the method advances to step 888. At step 888, the gaming machine ends the current game and offers a new game if another wager is place.

It is also contemplated that in one alternative embodiment the base game may comprise bingo or a bingo variation. The redraw round and/or feature award round may be added to the bingo or bingo variation base game.

As is understood, bingo comprises a game of chance where a player selects or is assigned a card containing randomly selected numbered squares. These may be referred to as card numbers. The house, game operator, or gaming machine then randomly selects called numbers. Although any number of called numbers may be generated and displayed, it is contemplated that a limited number of called numbers will be generated and displayed. It is contemplated that in this embodiment not all of the called numbers will be match to card numbers, but in some other embodiments all of the called numbers may be contained on the card and hence match to card numbers.

If a called number matches a card number, located on the card, the card number is highlighted or blotted, either manually by a player or automatically by the gaming machine. To achieve a winning outcome, a predetermined various pattern of highlighted or blotted card numbers must be achieved. These patterns may include but are not limited to blacked out, line, diagonal, U-shaped, outer edge, edge shaped, double line, triangle, cross, double X, corner square, center block, or any other shape or pattern. The cards are typically square in nature in that they have an equal number of row numbers as column numbers. In other embodiments, the cards may be other shapes or dimensions.

To incorporate the redraw round into a bingo or bingo-variation base game, after the player wager the gaming machine would randomly select and display one or more redraw trigger numbers on the screen that also displays the one or more the player selected or player assigned bingo cards. The card(s) are displayed on the screen. Then, during play of the base game if the called numbers, which are generated by a random number generator, match a predetermined number of redraw trigger numbers, then the player enters the redraw round and the gaming machine selects additional redraw called number which are displayed on the screen. The redraw called numbers populate the displayed card(s) and matches to card numbers may occur. The redraw called numbers may or may not found on the card(s) since in one embodiment the set of numbers available to be called is greater than the set of card numbers.

After all the redraw called numbers are generated and displayed. A comparison occurs to identify matches between the called numbers, including the redraw called numbers, and the card numbers. If sufficient matches occur or a predetermined pattern is matched, then the player is provided an award. By adding redraw called numbers to the called numbers, the chance of a player receiving a winning pattern is increased, which in turn increases game interest and game play.

The feature round may also be implemented with this bingo or bingo variation base game. To implement the feature round, the feature trigger numbers may be generated and displayed on the screen. If during the base game the called numbers match a predetermined number of feature trigger numbers, then the feature award round is activated. As described above, the feature award round may comprise a separate screen showing one or more award amounts. The award amounts may be predetermined or randomly generated and displayed to increase player excitement and add variation to game play.

It is also contemplated that with this bingo or bingo variation base game the redraw round may be combined with the feature award round. Hence, if the original called numbers match one or both of the redraw trigger numbers and the feature trigger numbers then the game may first enter either of the redraw round or the feature award round and thereafter, enter the remaining round. By combining the redraw round and the feature award round to the base game, player win opportunities and player interest is increased.

In addition, although the various embodiments disclosed herein are described in connection with an electronic gaming machine or in a video representation, such as a personal computer or Internet connected computer embodiment with a remote server, it is also contemplated that these game features and the base game may be implemented with a physical blower or basket configuration. In such an embodiment, a container filled with numbered balls or other numbered mixable items is provided. The numbered balls within the container are then randomly mixed, such as through air movement or basket rotation and then the numbered balls are selected to form draw numbers or called numbers. The draw numbers or called numbers are displayed to players either as drawn or on a video or illuminated display board. Game play proceeds as described above.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for providing a wagering game to a player comprising:

using a gaming machine having a screen, a non-transitory memory storing machine-readable code, and a processor configured to execute the machine-readable code, the machine-readable code as executed by the processor, performing at least part of a method comprising:
accepting a wager from a player;
presenting a wagering game to the player on the screen;
generating and displaying redraw trigger numbers on the screen;
accepting spot number selections from the player;
generating and displaying draw numbers on the screen;
comparing the draw number to the redraw trigger numbers;

responsive to the comparing of draw numbers to the redraw trigger numbers, generating and displaying redraw numbers on the screen,
wherein the redraw numbers supplement the draw numbers displayed on the screen to create a combined set of numbers;

comparing the combined set of numbers to the spot numbers; and responsive to the comparing of the combined set of numbers to the spot numbers,
providing a wager award to the player if a predetermined number of spot numbers match numbers in the combined set of numbers.

2. The method of claim 1, wherein three redraw trigger numbers are generated and displayed on the screen and the player selects spot numbers from a group of eighty numbers.

3. The method of claim 1, wherein accepting spot numbers comprises the player touching spot number selections on a touch screen.

4. The method of claim 1, wherein the machine-readable code as executed by the processor, performs at least a part of the method further comprising:

generating and displaying feature trigger numbers on the screen;

comparing the feature trigger numbers to the draw numbers;

responsive to the comparison, generating one or more random award amounts and awarding the player the one or more random award amounts.

5. The method of claim 1, further comprising responsive to the comparing, if the redraw trigger numbers do not match a predetermined number of draw numbers, then comparing the spot numbers to the draw numbers and if a predetermined number of spot numbers match draw numbers then providing a wager award to the player.

6. A gaming machine configured to offer a game of chance comprising:

a screen configured to present the game of chance to a player;

a processor configured to execute machine-readable code;

a non-transitory memory storing machine-readable code, the machine-readable code configured to present the game of
chance, the game of chance comprising, upon execution by the processor:
accepting a wager from the player;
generating one or more redraw trigger numbers;
displaying the one or more redraw trigger numbers on the screen;
receiving one or more spot numbers designated by the player;
generating one or more draw numbers;
displaying the one or more draw numbers on the screen;
comparing the one or more draw numbers to the redraw trigger numbers and if a predetermined number of redraw trigger numbers match the draw numbers then entering a redraw round, wherein the redraw round comprises;
generating one or more redraw numbers;
displaying the one or more redraw numbers on the screen;
comparing the one or more redraw numbers in combination with the draw numbers to the spot numbers and if a predetermined number of redraw numbers and draw numbers match the spot numbers, then providing an award to the player.

7. The gaming machine of claim 6, wherein the screen comprises a touch screen configured to accept input from the player.

8. The gaming machine of claim 6, wherein the award comprises an award of credits, which are added to a credit display on the screen.

9. The gaming machine of claim 6, the player selects between 3 and 10 spots and the machine-readable code generates 20 drawn numbers.

10. The gaming machine of claim 6, wherein three redraw trigger numbers are generated.

11. The gaming machine of claim 6, wherein the game of chance further comprises:

generating one or more feature trigger numbers;

displaying the one or more feature trigger numbers on the screen;

comparing the one or more feature trigger numbers to the one or more draw numbers and if a predetermined number of feature trigger numbers and draw numbers match then awarding the player one or more credits.

12. The gaming machine of claim 11, wherein the predetermined number of redraw trigger numbers comprises three numbers and the predetermined number of feature trigger numbers comprises four numbers.

13. The gaming machine of claim 6, further comprising, if a redraw round is not entered, comparing the one or more draw numbers to the one or more spots and if a predetermined number of draw numbers and spot numbers match, then providing an award to the player.

14. A gaming machine configured to offer a game of chance comprising:

a screen configured to present the game of chance to a player;

a processor configured to execute machine-readable code;

a non-transitory memory storing machine-readable code, the machine-readable code configured when executed by the processor, to perform:

accepting a wager from the player;

generating and displaying one or more redraw trigger numbers;

generating and displaying one or more feature trigger numbers;

receiving one or more spot numbers designated by the player;

generating one or more draw numbers;

displaying the one or more draw numbers on the screen;

comparing the one or more draw numbers to the redraw trigger numbers and if a predetermined number of redraw trigger numbers match the draw numbers a redraw round is entered, wherein the redraw round comprises;

generating one or more redraw numbers;

displaying the one or more redraw numbers on the screen;

comparing a combined group of one or more redraw numbers and the one or more draw numbers to the spot numbers and if a predetermined number of the combined group match the spot numbers, providing an award to the player; and comparing the one or more draw numbers to the feature trigger numbers and if a predetermined number of feature trigger numbers match the draw numbers then entering a bonus round wherein the player is awarded one or more credits.

15. The gaming machine of claim 14, wherein the predetermined number of redraw trigger numbers comprises three numbers and the predetermined number of feature trigger numbers comprises four numbers.

16. The gaming machine of claim 14, wherein the game of chance comprises keno with additional redraw and feature award opportunities.

17. The gaming machine of claim 14, further comprising, if a predetermined number of redraw trigger numbers fail to match the draw numbers, comparing the draw numbers to the spot numbers and if a predetermined number of the draw numbers match the spot numbers, providing an award to the player.

* * * * *

UNITED STATES PATENT AND TRADEMARK OFFICE

CERTIFICATE OF CORRECTION

| | |
|---|---|
| PATENT NO. | : 8,668,569 B2 |
| APPLICATION NO. | : 12/932482 |
| DATED | : March 11, 2014 |
| INVENTOR(S) | : Ross Gilbertson and David Kaylock |

It is certified that error appears in the above-identified patent and that said Letters Patent is hereby corrected as shown below:

On the title page:

In ITEM (75) Inventors: change "Ultimo (AU);" to --Ultimo NSW (AU);--
change "Pearce (AU)" to --Pearce ACT (AU)--

In ITEM (73) Assignee: change "Entertainment" to --entertainment--

In the specification:

COLUMN 12, LINE 21, change "embodiment" to --embodiments--
COLUMN 13, LINE 43, change "Alternative," to --Alternatively,--

In the claims:

CLAIM 9, COLUMN 16, LINE 50, change "the player" to --wherein the player--

Signed and Sealed this
Fifteenth Day of September, 2015

Michelle K. Lee
*Director of the United States Patent and Trademark Office*